(12) United States Patent
Pickens (10) Patent No.: US 10,232,474 B2
(45) Date of Patent: Mar. 19, 2019

(54) GAS TURBINE ENGINE COMPONENTS AND METHOD OF ASSEMBLY

(71) Applicant: UNITED TECHNOLOGIES CORPORATION, Farmington, CT (US)

(72) Inventor: John T. Pickens, East Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 106 days.

(21) Appl. No.: 15/189,573

(22) Filed: Jun. 22, 2016

(65) Prior Publication Data

US 2016/0303693 A1 Oct. 20, 2016

Related U.S. Application Data

(62) Division of application No. 13/645,604, filed on Oct. 5, 2012.

(Continued)

(51) Int. Cl.
*F02C 3/04* (2006.01)
*B23P 15/04* (2006.01)
(Continued)

(52) U.S. Cl.
CPC ............ *B23P 15/04* (2013.01); *F01D 17/162* (2013.01); *F01D 25/24* (2013.01); *F01D 25/28* (2013.01); *F02C 3/04* (2013.01); *F04D 29/563* (2013.01); *G01B 21/08* (2013.01); *B23P 19/10* (2013.01); *F05D 2220/32* (2013.01); *F05D 2230/60* (2013.01); *F05D 2230/644* (2013.01); *Y10T 29/49234* (2015.01)

(58) Field of Classification Search
CPC ........ F01D 17/16; F01D 17/162; F01D 25/28; F04D 29/563; B21D 39/04; B21D 39/046; F05D 2230/60; F05D 2230/64; F05D 2230/644; B23P 2700/13; B23P 19/10; G01B 21/08
See application file for complete search history.

(56) References Cited

U.S. PATENT DOCUMENTS 2,933,234 A 4/1960 Neumann
3,330,562 A 7/1967 Woollam
(Continued)

OTHER PUBLICATIONS

International Search Report and Written Opinion for PCT Application No. PCT/US2013/061326 dated Dec. 19, 2013.
(Continued)

*Primary Examiner* — Christopher J Besler
(74) *Attorney, Agent, or Firm* — Carlson, Gaskey & Olds (57) ABSTRACT

An exemplary gas turbine engine component assembly includes, among other things, a case having a generally cylindrical outer surface. At least one synchronizing ring is received at least partially about the outer surface of the case. A plurality shims situated between an inner surface on the at least one synchronizing ring and the outer surface of the case at a plurality of shim locations are circumferentially spaced about the case outer surface. Each shim location includes at least one of the shims. A radial thickness of the shims at a first one of the shim locations is different than the radial thickness of the shims at a second one of the shim locations.

11 Claims, 4 Drawing Sheets

Related U.S. Application Data (60) Provisional application No. 61/707,134, filed on Sep. 28, 2012.

(51) Int. Cl.
    *B23P 19/10*    (2006.01)
    *F01D 17/16*    (2006.01)
    *F01D 25/24*    (2006.01)
    *F01D 25/28*    (2006.01)
    *F04D 29/56*    (2006.01)
    *G01B 21/08*    (2006.01)

(56) References Cited

U.S. PATENT DOCUMENTS

| | | |
|---|---|---|
| 4,812,106 A | 3/1989 | Purgavic |
| 4,925,364 A | 5/1990 | Das |
| 6,884,025 B2 | 4/2005 | Pickens et al. |
| 7,198,454 B2 | 4/2007 | Evans |
| 8,092,157 B2 | 1/2012 | McCaffrey |
| 8,528,181 B2 | 9/2013 | Maurell et al. |
| 2004/0062641 A1 | 4/2004 | Pickens et al. |
| 2006/0193720 A1 | 8/2006 | Bromann |
| 2007/0043497 A1 | 2/2007 | Leogrande et al. |
| 2007/0183889 A1 | 8/2007 | Bromann |
| 2011/0005054 A1 | 1/2011 | Maurell et al. |
| 2012/0076641 A1 | 3/2012 | Jarrett, Jr. et al. |
| 2012/0195751 A1 | 8/2012 | Gasmen et al. |
| 2012/0195755 A1 | 8/2012 | Gasmen et al. |
| 2012/0291437 A1* | 11/2012 | Moehrle ............... F23R 3/002 60/722 |

OTHER PUBLICATIONS

Extended European Search Report for Application No. EP 13 84 1159 dated Mar. 11, 2016.

International Preliminary Report on Patentabililty for PCT Application No. PCT/US2013/061326 dated Apr. 9, 2015.

\* cited by examiner

GAS TURBINE ENGINE COMPONENTS AND METHOD OF ASSEMBLY

CROSS REFERENCE TO RELATED APPLICATION

This application is a divisional of U.S. patent application Ser. No. 13/645,604, filed Oct. 5, 2012, which claims priority to U.S. Provisional Application No. 61/707,134 which was filed on Sep. 28, 2012.

BACKGROUND

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure compressor, for example, includes a case and a plurality of synchronizing rings. Assembling the high pressure compressor requires attempting to situate the synchronizing rings relative to the case to achieve desired compressor performance during operation. During actuation it is possible for the synchronizing rings to become distorted. The typical way to attempt to avoid such distortion is to minimize the gap between the case and the rings, which are received around the case. Conventional techniques for achieving this include using adjustable bumpers or shims between the case and the synchronizing rings in the spacing between the outside of the case and the rings received about the case. One drawback associated with some adjustable bumpers is that they introduce the possibility for a technician to deform the ring during assembly. Another drawback is that during operation the load path goes through the threaded adjusting which can pose wear or durability concerns. A drawback associated with some shimming techniques is that they require more calculations by a technician. Additionally, shimming techniques tend to require a higher part count.

SUMMARY

An exemplary gas turbine engine component assembly includes, among other things, a case having a generally cylindrical outer surface. At least one synchronizing ring is received at least partially about the outer surface of the case. A plurality shims situated between an inner surface on the at least one synchronizing ring and the outer surface of the case at a plurality of shim locations are circumferentially spaced about the case outer surface. Each shim location includes at least one of the shims A radial thickness of the shims at a first one of the shim locations is different than the radial thickness of the shims at a second one of the shim locations.

A further non-limiting embodiment of the foregoing gas turbine engine component assembly includes at least one bumper at each of the shim locations.

A further non-limiting embodiment of either of the foregoing gas turbine engine component assemblies includes a plurality of synchronizing rings and a plurality of shims between the case and each of the synchronizing rings, respectively.

In a further non-limiting embodiment of any of the foregoing gas turbine engine component assemblies, the synchronizing ring has an outer surface. The distance between the outer surface of the synchronizing ring and a center of the case is approximately equal at each of the shim locations.

In a further non-limiting embodiment of any of the foregoing gas turbine engine component assemblies, the distance between the outer surface of the synchronizing ring and the center of the case is approximately equal around an entire circumference of the synchronizing ring.

An exemplary device for facilitating assembling gas turbine engine components includes, among other things, at least one computing device including a data storage and a processor associated with the data storage. The data storage includes a memory portion configured to at least temporarily store user input regarding at least one dimension associated with the gas turbine engine components. The processor is configured to determine an assembled shim thickness for each of a plurality of shim locations between an outer surface of a case and an inner surface of a synchronizing ring received about the case based on the user input in the data storage. At least one of the assembled shim thicknesses is different than another one of the assembled shim thicknesses.

In a further non-limiting embodiment of the foregoing device for assembling gas turbine engine components, the processor is configured to determine an initial shim thickness corresponding to each of the plurality of shim locations from a corresponding plurality of user inputs indicating the initial shim thicknesses. The processor is configured to determine a measurement shim thickness to be placed at each of the shim locations based on the determined plurality of initial shim thicknesses, the measurement shim thickness being the same for all of the shim locations. The processor is configured to determine a distance between the outer surface of the synchronizing ring and a center of the case near each of the shim locations based on user inputs regarding a measured dimension near each of the shim locations with the uniform measurement shim thickness at each of the shim locations. The processor is configured to determine the assembled shim thickness for each of the shim locations from the determined distances, respectively.

In a further non-limiting embodiment of the foregoing device for assembling gas turbine engine components, the processor is configured to provide a prompt for a user to enter the user inputs indicating the initial shim thicknesses, provide an indication of the determined measurement thickness after receiving the user inputs indicating the initial shim thicknesses, provide a prompt for a user to enter the user inputs regarding the measured dimension near each of the shim locations, and provide an indication of the assembled shim thicknesses after receiving the user inputs regarding the measured dimensions.

In a further non-limiting embodiment of either of the foregoing devices for assembling gas turbine engine components, the processor is configured to provide a prompt for a user to enter at least two user inputs regarding two measured dimensions near each of the shim locations, determine an average of the two measured dimensions for each shim location and use the determined average for each shim location for determining the corresponding assembled shim thicknesses.

In a further non-limiting embodiment of any of the foregoing devices for assembling gas turbine engine components, the measured dimension near each shim location comprises at least one of a distance between an outer surface on the synchronizing ring and the outer surface of the case or a distance between the outer surface on the synchronizing ring and the inner surface on the synchronizing ring.

An exemplary method of assembling gas turbine engine components includes, among other things, situating at least one synchronizing ring about a generally cylindrical case such that an inner surface of the synchronizing ring faces an outer surface of the case. An assembled shim thickness is determined for each of a plurality of shim locations, respectively, between the inner surface of the synchronizing ring and the outer surface of the case for establishing a substantially equal spacing between an outer surface of the synchronizing ring and a reference location. A number of shims corresponding to the determined assembled shim thickness are situated at each of the shim locations, respectively.

In a further non-limiting embodiment of the foregoing method of assembling gas turbine engine components, shims having an initial shim thickness are positioned at each of the plurality of shim locations, respectively. A measurement shim thickness to be placed at each of the shim locations is determined based on the initial shim thicknesses, the measurement shim thickness being the same for all of the shim locations. Shims having the measurement shim thickness are positioned at each of the shim locations. A distance between the outer surface of the synchronizing ring and the reference location associated with the case is determined near each of the shim locations with the uniform measurement shim thickness at each of the shim locations. The assembled shim thickness for each of the shim locations is determined from the determined distances, respectively.

In a further non-limiting embodiment of either of the foregoing methods of assembling gas turbine engine components, two distances between the outer surface of the synchronizing ring and the reference location are determined near each of the shim locations. An average of the two measured dimensions for each shim location is determined and the determined average for each shim location is used for determining the corresponding assembled shim thicknesses.

In a further non-limiting embodiment of any of the foregoing methods of assembling gas turbine engine components, the measured dimension near each shim location is determined by at least one of determining a distance between an outer surface on the synchronizing ring and the outer surface of the case near each shim location or determining a distance between the outer surface on the synchronizing ring and the inner surface on the synchronizing ring near each shim location.

In a further non-limiting embodiment of any of the foregoing methods of assembling gas turbine engine components, the assembled shim thickness at each of the shim locations establishes a distance between the outer surface of the synchronizing ring and a center of the case that is approximately equal at each of the shim locations.

In a further non-limiting embodiment of any of the foregoing methods of assembling gas turbine engine components, the assembled shim thickness at each of the shim locations establishes a distance between the outer surface of the synchronizing ring and a center of the case that is approximately equal around an entire circumference of the synchronizing ring.

In a further non-limiting embodiment of any of the foregoing methods of assembling gas turbine engine components, the assembled shim thickness at a first one of the shim locations is different than the assembled shim thickness at a second one of the shim locations.

The various features and advantages of disclosed examples will become apparent to those skilled in the art from the following detailed description. The drawings that accompany the detailed description can be described as follows.

DETAILED DESCRIPTION

Figure 1:
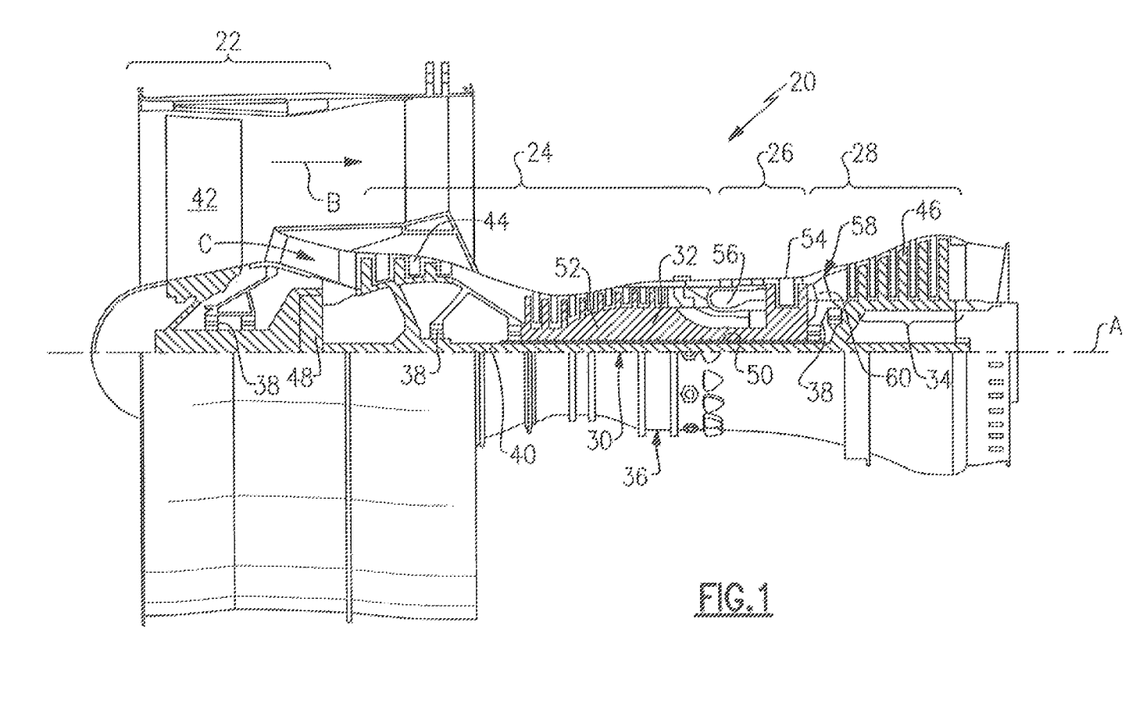
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to the combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts disclosed in this description and the accompanying drawings are not limited to use with turbofans as the teachings may be applied to other types of turbine engines, such as a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used in this description, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 and sets airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram °R)/518.7)^{0.5}]$. The "Low corrected fan tip speed", according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
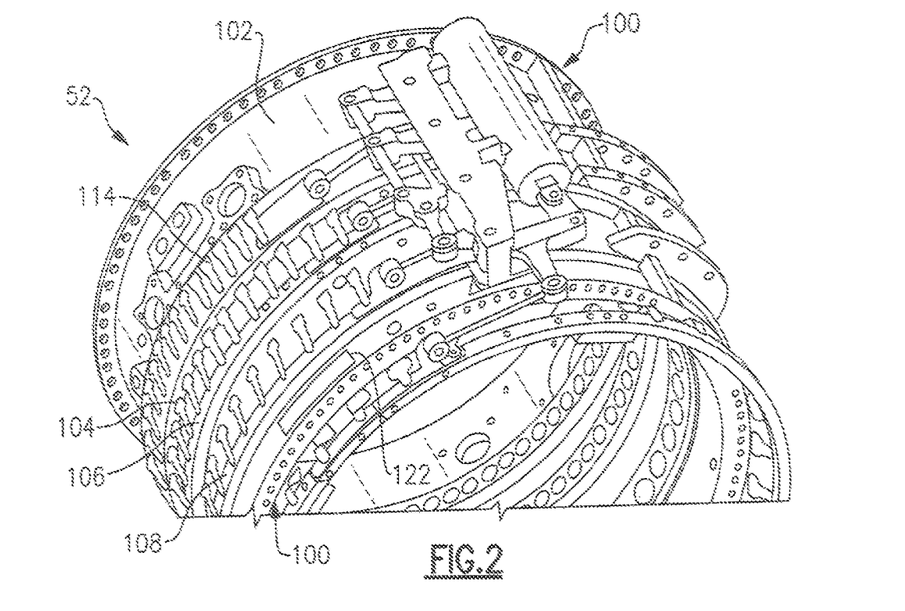
FIG. 2 schematically illustrates selected components of the example gas turbine engine.

FIG. 2 schematically illustrates a selected portion of the gas turbine engine 20. FIG. 2 schematically shows portions of the compressor 52, which is a high pressure compressor in this example. A case 100 has a generally cylindrical outer surface 102. A plurality of synchronizing rings are received about the case 100. In the illustrated example, synchronizing rings 104, 106 and 108 are situated around the outer surface 102 of the case 100.

Figure 3:
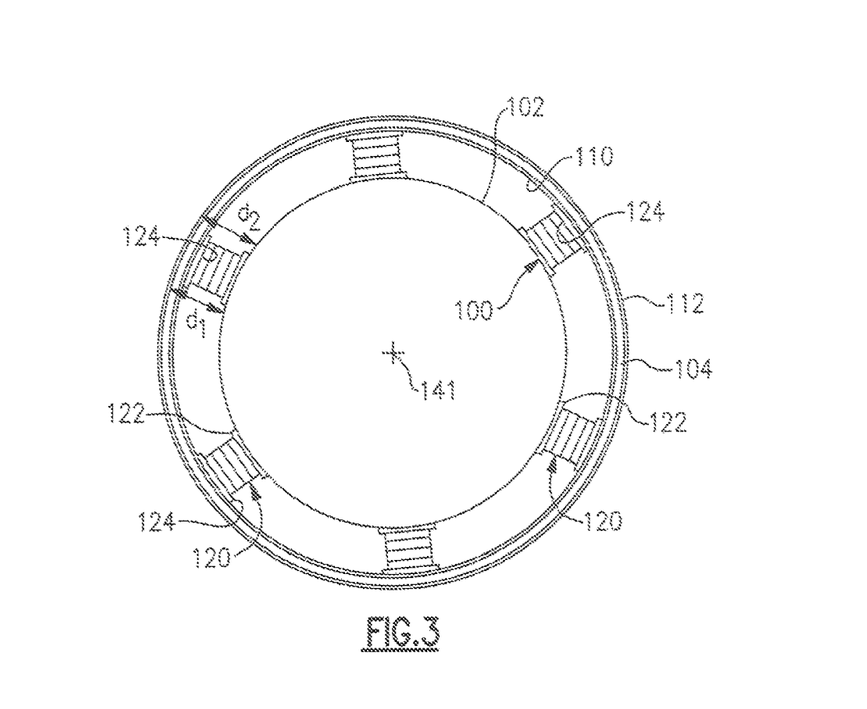
FIG. 3 schematically illustrates a synchronizing ring and a case during a portion of an example assembly procedure.

FIG. 3 schematically illustrates the synchronizing ring 104 and the case 100 during a portion of an assembly process. The synchronizing ring 104 has an inner surface 110 facing toward the outer surface 102 of the case 100. An outer surface 112 of the synchronizing ring 104 is configured to support a plurality of vane arms 114 (shown in FIG. 2) in a known manner A plurality of shims 120 is situated between the outer surface 102 of the case 100 and the inner surface 110 of the synchronizing ring 104. The plurality of shims 120 are situated at circumferentially spaced shim locations. In this example, each shim location includes a pad surface 122 on the case 100 and a bumper 124 on the inner surface 110 of the synchronizing ring 104.

Figure 4:
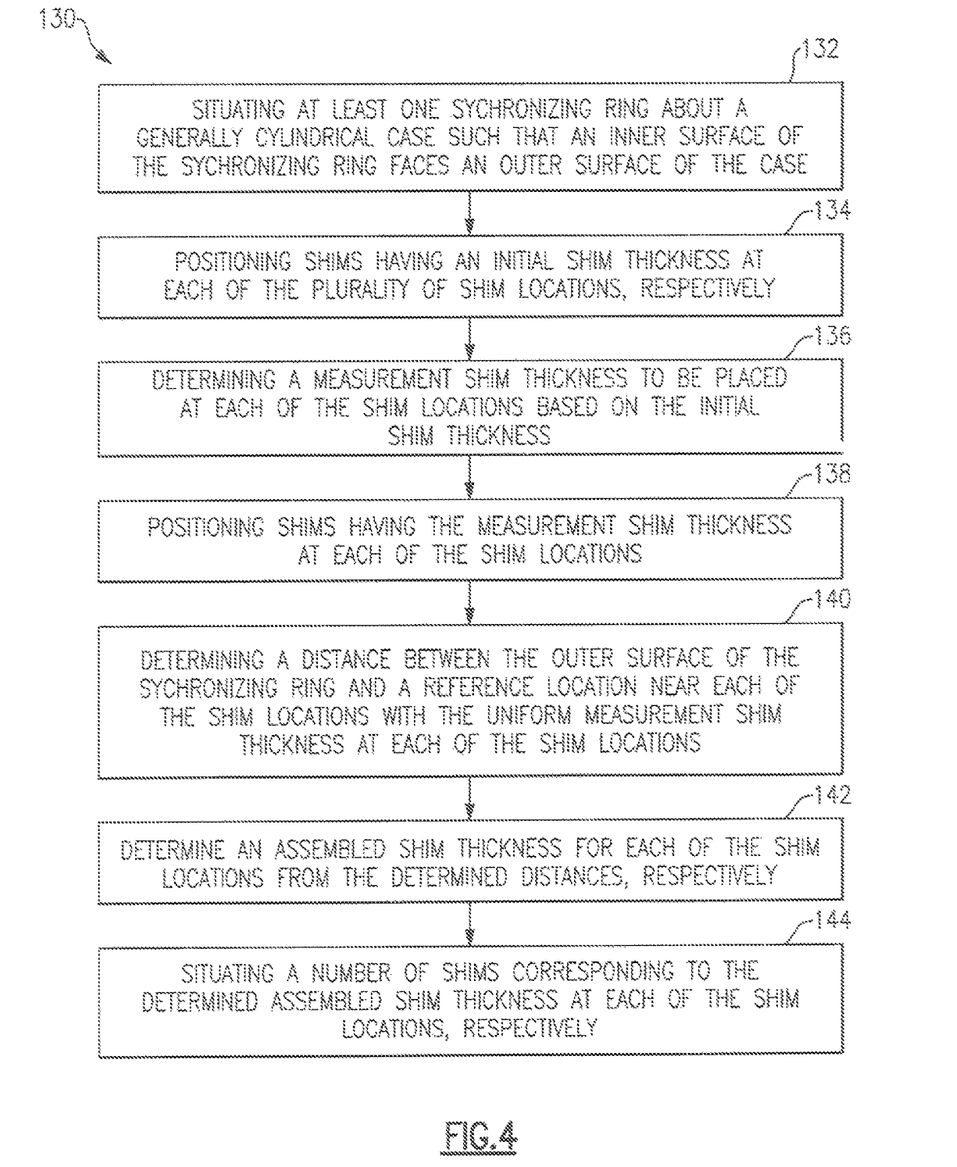
FIG. 4 is a flowchart diagram summarizing an example assembly procedure.

FIG. 4 includes a flowchart diagram that summarizes an example procedure 130 for assembling the synchronizing rings 104-108 and the case 100. For discussion purposes, the synchronizing ring 104 will be discussed. The same steps may be repeated for each of the synchronizing rings to complete the assembly of components.

The procedure 130 begins at 132 by situating the synchronizing ring 104 about the outer surface of the case 100 such that the inner surface 110 on the synchronizing ring 104 faces the outer surface 102 on the case 100. At 134, shims 120 are positioned at each of the plurality of shim locations. The set of shims at each shim location has its own initial shim thickness. In one example, the initial shim thickness at each shim location will depend on the number of shims 120 that can fit within the spacing between the surfaces 110 and 102 without pulling on the synchronizing ring 104. Once the step at 134 is completed, the shims 120 can be removed from the shim locations.

This example includes using the initial shim thickness at each shim location to determine a measurement shim thickness to be placed at each of the shim locations as shown at 136. In one example, an average initial shim thickness is determined based on each of the initial shim thicknesses.

The average shim thickness is used as the measurement shim thickness in the illustrated example.

At 138, a number of shims 120 are positioned at each of the shim locations corresponding to the measurement shim thickness. One example includes beginning with the shim location that had the smallest initial shim thickness and using a so-called star pattern among the shim locations until shims 120 having the measurement shim thickness are installed at each shim location. The measurement thickness of the shims 120 in this example results in a zero bumper gap at each shim location. One example includes accepting a tolerance of 0.002 inches variation in the shim thickness to achieve a zero bumper gap at each of the shim locations.

At 140, a distance between the outer surface 112 of the synchronizing ring 104 and a reference location is determined near each of the shim locations while the shims 120 having the uniform measurement shim thickness are situated at each of the shim locations. FIG. 3 schematically illustrates taking a measurement of a distance d1 between the outer surface 112 of the synchronizing ring 104 and the outer surface 102 of the case 100. Another measurement d2 is taken in this example. In some examples, the measurement distance will be between the outer surface 112 of the synchronizing ring 104 and the corresponding pad surface 122 at that shim location. Taking more than one measurement (e.g., the measurements of d1 and d2) at each location allows for determining an average dimension associated with each shim location. In such an example, the outer surface 102 of the case 100 is used as a reference location for the distance measurement. The case 100 is manufactured to a tolerance that yields a sufficiently reliable configuration that the case 100 serves as a useful reference location.

In another example, a distance from the outer surface 112 to a center 141 of the case 100 is utilized. In another example, measurements are taken of the thickness of the synchronizing ring 104 between the outer surface 112 of the synchronizing ring 104 and the inner surface 110 of the same synchronizing ring at each of the shim locations. When the measurement thickness of the shims 120 is the same at each shim location, the thickness of the synchronizing ring near each shim location provides an indication of a distance between the outer surface 112 of the synchronizing ring 104 at that location and a reference point relative to the case 100 even though the actual measurement is taken of the thickness or distance between the inner and outer surfaces on the synchronizing ring. Given this description, those skilled in the art will realize what measurement will work best in their particular situation. For example, a depth micrometer will be useful for taking a measurement as shown at d1 and d2 in FIG. 3. Another type of micrometer may be used for measuring the thickness of the synchronizing ring at each of the shim locations.

At 142, an assembled shim thickness for each of the shim locations is determined from the just-described distances measured at each of the shim locations. The assembled shim thickness for each shim location indicates the thickness of the shims that should be positioned at each location, respectively, to achieve desired operation of the components of the compressor 52. At 144, a number of shims 120 corresponding to the determined assembled shim thickness for each of the shim locations, respectively, are situated at each of the shim locations.

One feature of the described procedure is that it establishes a desired orientation of the outer surface 112 of the synchronizing ring relative to the case 100. Conventional shimming practice has been to only focus on the relationship between the inner surface 110 of the synchronizing ring and the outer surface 102 of the case 100. There can be variations, however, in the thickness of the bumpers 124 and the configuration or thickness of the synchronizing ring. Such variations can result in a synchronizing ring outer surface that is not concentric with the case 100. Determining the distance between the outer surface 112 of the synchronizing ring 104 and a reference location (e.g., step 140 in FIG. 4), facilitates establishing a desired orientation of the outer surface 112 relative to the case 100.

In situations where there are variations along the synchronizing ring (e.g., variations in bumper thickness), the assembled shim thickness at one or more of the shim locations may be different than the assembled shim thickness at another one of the shim locations. The different assembled shim thicknesses account for or accommodate any variations in the synchronizing ring that would otherwise result in the outer surface 112 not being concentrically aligned with the case 100 around the entire circumference of the synchronizing ring. The described procedure at least establishes a uniform dimension between the outer surface 112 of the synchronizing ring 104 and a reference location (e.g., the center 141 of the case 100) at each of the shim locations.

One example includes determining whether the measurements taken of the distance between the outer surface of the synchronizing ring and the reference location are within an acceptable tolerance. In one example, when the measured distances are all within 0.0025 inches of each other, an equal assembled shim thickness may be used at each of the shim locations to provide an acceptable alignment of the outer surface 112 of the synchronizing ring 104 and the case 100. In such an example, if any of the distances determined during step 140 of FIG. 4 is not within 0.0025 inches of the other distances, at least one of the shim locations will include a different assembled shim thickness compared to at least one other of the shim thicknesses at another one of the shim locations.

The shims 120 used for each of the steps described above may be the same. Using the different terms for initial, measurement and assembled shim thickness is intended to distinguish between the shim thicknesses during the different stages of the described procedure. Those thicknesses may be different from each other at any of the shim locations. The modifiers "initial," "measurement" and "assembled" are not intended to imply any difference in the shims, themselves. One example includes using a known shim configuration for each of the steps described above.

Figure 5:
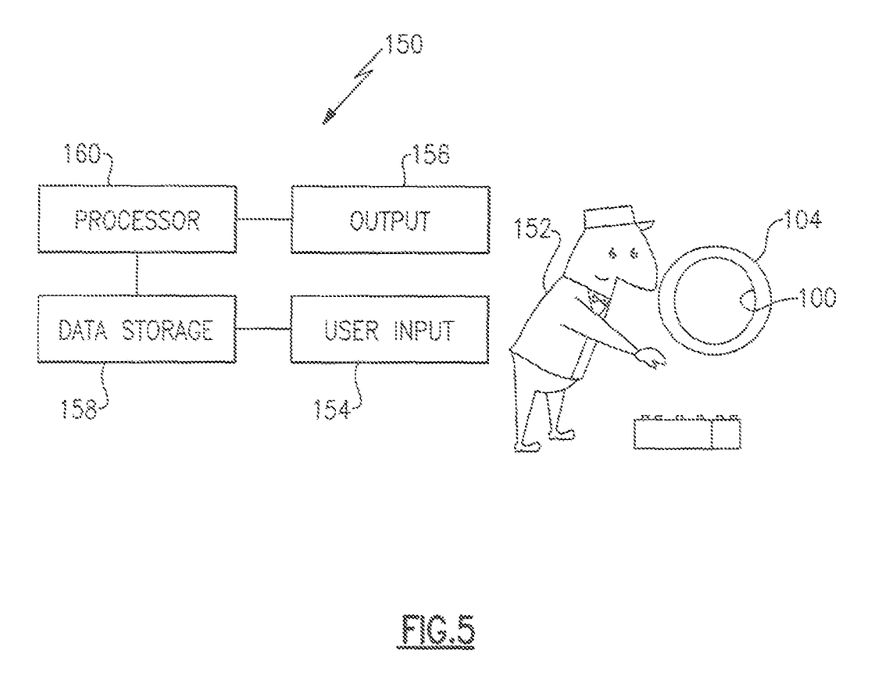
FIG. 5 schematically illustrates a device useful for performing the example assembly procedure of FIG. 4.

FIG. 5 schematically illustrates a device 150 that facilitates a technician 152 performing the procedure 130 summarized in FIG. 4. A user input portion 154 includes an interface that allows the technician 152 to enter information regarding various stages of the described procedure. One example input portion 154 comprises a keyboard and a display screen or a touch screen. An output portion 156 provides the technician 152 with information to facilitate performing one or more of the steps in the described procedure. One example output portion 156 comprises at least one of a display screen or a printer. For example, the user input portion 154 is configured to allow the technician 152 to enter information regarding the initial shim thickness at each of the shim locations, respectively. A data storage 158 at least temporarily stores information provided by the technician. A processor 160 utilizes that information for automatically determining the measurement shim thickness for each of the shim locations. The output portion 156 provides an indication to the technician 152 regarding the determined measurement shim thickness.

The user input 154 also allows the technician 152 to enter information regarding the distance between the outer surface 112 of the synchronizing ring 104 and the reference location (e.g., after taking a measurement at each location). Such information is at least temporarily maintained in the data storage 158. The processor 160 utilizes the distance information provided by the technician 152 for automatically determining the assembled shim thickness for each of the shim locations, respectively. The output portion 156 provides the technician 152 with the information needed by the technician 152 to complete the assembly procedure in a manner that results in the desired alignment of the outer surface 112 of the synchronizing ring relative to the case 100.

In one example, the output portion 156 presents information to the technician 152 in a spreadsheet format. The output portion 156 also guides the technician 152 while inputting the necessary information for completing the procedure 130. For example, any measurement of a shim thickness or distance required from the technician 152 has an input field or box that must be completed by the technician before proceeding to the next step of the procedure 130. Information useful for completing the next step is provided to the technician in corresponding fields or boxes. Additionally, the processor 160 is configured to determine when any measurement or distance appears to be incorrect or improbable for a given configuration of the components being assembled. Such a determination is indicated to the technician 152 on the output portion 156 to avoid assembly error.

One feature of the device 150 is that it automates at least a portion of the procedure 130 for assembling the components such as the case 100 and the synchronizing rings 104-108. The device 150 facilitates mistake-proofing the assembly process and minimizes or eliminates need for the technician 152 to calculate desired shim thicknesses.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A method of assembling gas turbine engine components, comprising the steps of:
    situating at least one synchronizing ring about a generally cylindrical case such that an inner surface of the synchronizing ring faces an outer surface of the case;
    positioning a first number of shims collectively corresponding to an initial shim thickness at each of a plurality of shim locations, respectively, to establish the initial shim thickness between the inner surface of the synchronizing ring and the outer surface of the case at each of the shim locations;
    determining a measurement shim thickness for all of the shim locations based on the initial shim thicknesses, the measurement shim thickness being the same for all of the shim locations;
    positioning a second number of shims collectively corresponding to the measurement shim thickness at each of the shim locations, respectively, wherein the second number of shims is the same as the first number of shims at any of the shim locations where the initial shim thickness is the same as the measurement shim thickness, wherein the second number of shims is different than the first number of shims at any of the shim locations where the initial shim thickness is different than the measurement shim thickness, and wherein positioning the second number of shims at each of the shim locations establishes the measurement shim thickness at each of the shim locations;
    determining, for each shim location, a distance between an outer surface of the synchronizing ring and at least one reference location associated with the case with the second number of shims at each shim location;
    determining an assembled shim thickness for each of the shim locations from the determined distances, respectively, for establishing a substantially equal spacing between the outer surface of the synchronizing ring and the at least one reference location; and
    situating a third number of shims collectively corresponding to the determined assembled shim thickness at each of the shim locations, respectively, wherein the third number of shims is different than the second number of shims at any of the shim locations where the assembled shim thickness is different than the measurement shim thickness, wherein the third number of shims is the same as the second number of shims at any of the shim locations where the measurement shim thickness is the same as the assembled shim thickness, and wherein situating the third number of shims at each of the shim locations establishes the determined assembled shim thickness at each of the shim locations.

2. The method of claim 1, wherein
    determining the distance between the outer surface of the synchronizing ring and the at least one reference location comprises
        determining two distances between the outer surface of the synchronizing ring and the at least one reference location near each of the shim locations; and
        determining an average of the two distances for each shim location; and
    determining the assembled shim thickness for each of the shim locations comprises using the determined average for each shim location.

3. The method of claim 1, wherein determining the distance between the outer surface of the synchronizing ring and the at least one reference location near each shim location comprises at least one or both of
    determining a distance between an outer surface on the synchronizing ring and the outer surface of the case near each shim location, and
    determining a distance between the outer surface on the synchronizing ring and the inner surface on the synchronizing ring near each shim location.

4. The method of claim 1, wherein
    situating the third number of shims at each of the shim locations, respectively, establishes a distance between the outer surface of the synchronizing ring and a center of the case that is approximately equal at each of the shim locations.

5. The method of claim 4, wherein situating the third number of shims at each of the shim locations, respectively, establishes a distance between the outer surface of the synchronizing ring and a center of the case that is approximately equal around an entire circumference of the synchronizing ring.

6. The method of claim 1, wherein the assembled shim thickness at a first one of the shim locations is different than the assembled shim thickness at a second one of the shim locations.

7. The method of claim 1, wherein situating the third number of shims at any of the shim locations where the assembled shim thickness is different than the measurement shim thickness includes removing the second number of shims and replacing the removed second number of shims with the third number of shims.

8. The method of claim 1, wherein positioning the second number of shims at any of the shim locations where the measurement shim thickness is different than the initial shim thickness includes removing the first number of shims and replacing the removed first number of shims with the second number of shims.

9. The method of claim 1, comprising
using a device that includes an interface configured to allow a user to enter information regarding the measured distance between the outer surface of the synchronizing ring and the at least one reference location for each of the shim locations; and
using the device for automatically determining the assembled shim thickness for each of the shim locations, respectively.

10. The method of claim 9, comprising
using the device to guide the user through performing the method including requiring the user to enter information for each of the shim thicknesses and the distances for each of the shim locations prior to providing further information to the user regarding a subsequent portion of the method.

11. The method of claim 9, comprising
using the device to allow a user to enter information regarding the initial shim thickness at each of the shim locations; and
using the device for automatically determining the measurement shim thickness.

* * * * *